United States Patent [15] 3,638,121
Spilker, Jr. [45] Jan. 25, 1972

[54] NONPERIODIC ENERGY COMMUNICATION SYSTEM CAPABLE OF OPERATING AT LOW SIGNAL-TO-NOISE RATIOS

[72] Inventor: James J. Spilker, Jr., Palo Alto, Calif.
[73] Assignee: Lockheed Aircraft Corporation, Burbank, Calif.

[22] Filed: Dec. 20, 1960
[21] Appl. No.: 77,241

[52] U.S. Cl. ....................325/32, 179/1.5
[51] Int. Cl. ....................H04k 1/00
[58] Field of Search ....................250/6.6, 6.9; 331/37, 76, 78; 328/15, 16; 325/32; 179/1.5

[56] References Cited

UNITED STATES PATENTS 2,418,119 4/1947 Hansen....................250/6.6
2,483,226 9/1949 .Neuman....................331/37
2,743,367 4/1956 Felch et al.....................331/76

*Primary Examiner*—Rodney D. Bennett, Jr.
*Assistant Examiner*—H. A. Birmiel
*Attorney*—George C. Sullivan

EXEMPLARY CLAIM

1. An intelligence communication system comprising a transmitter and a receiver, said transmitter comprising means for obtaining a narrow band reference signal, bandwidth expansion means for expanding said reference signal into a wide band signal having a bandwidth very much greater than the bandwidth of said reference signal, means for modulating said wide band signal with an intelligence signal and said narrow band reference signal, and means for delivering to said receiver a signal corresponding to said wide band signal modulated by said reference signal and said intelligence signal; said receiver comprising means for deriving said narrow band reference signal from the signal delivered to said receiver from said transmitter, bandwidth expansion means for expanding the derived reference signal into a wide band signal substantially identical to the wide band signal produced by said bandwidth expansion means in said transmitter, and means for comparing the signal delivered to said receiver from said transmitter with the wide band signal from said bandwidth expansion means in said receiver to recover said intelligence signal.

9 Claims, 9 Drawing Figures

INVENTOR.
JAMES J. SPILKER, JR.
BY George C. Sullivan
Agent

INVENTOR.
JAMES J. SPILKER, JR.
BY George C. Sullivan
Agent

INVENTOR.
JAMES J. SPILKER, JR.
BY
George C. Sullivan
Agent

INVENTOR.
JAMES J. SPILKER, JR.
BY George C. Sullivan
Agent

NONPERIODIC ENERGY COMMUNICATION SYSTEM CAPABLE OF OPERATING AT LOW SIGNAL-TO-NOISE RATIOS

This invention relates generally to means and methods of transmitting and receiving intelligence, and more particularly to a nonperiodic signal communication system.

It is the principle object of the present invention to provide a transmitting and receiving communication system which is capable of operating successfully at low signal-to-noise ratios at the input of the receiver.

Another object of this invention is to provide a nonperiodic carrier communication system which achieves a high order of secrecy without the need for complex synchronization means.

A further object of this invention is to provide a nonperiodic carrier communication system having a high immunity to jamming.

Still another object of this invention is to provide improved means and methods of bandwidth expansion.

In accordance with a typical embodiment of the invention, the above objects are accomplished by means of a transmitting and receiving communication system in which a narrow band nonperiodic reference signal is predictably expanded into a wide band nonperiodic signal and then employed as the transmitter carrier. This wide band nonperiodic transmitter carrier is modulated by both the intelligence to be transmitted and the narrow band nonperiodic signal and the resulting modulated wide band nonperiodic signal is then radiated to the receiver. At the receiver the narrow band reference nonperiodic signal is first recovered and expanded to produce the same wide band nonperiodic signal as was produced at the transmitter and then mixed with the wide band nonperiodic received signal containing the intelligence in order to enable the intelligence to be recovered at a high signal-to-noise ratio.

The specific nature of the invention as well as other advantages, objects, and uses thereof will clearly appear from the following description and the accompanying drawing in which.

Like numerals designate like elements throughout the figures of the drawing.

Figure 1:
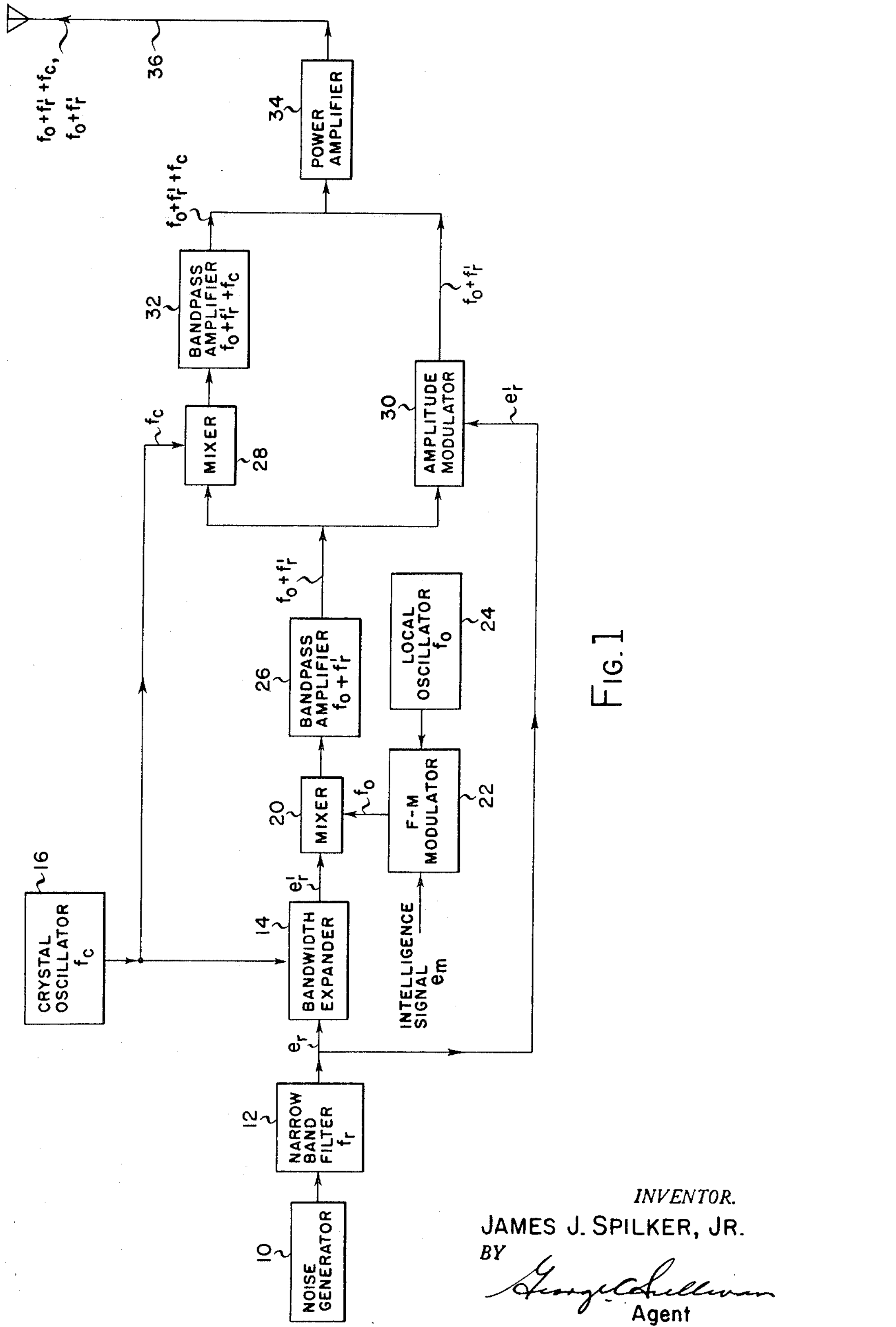
FIG. 1 is a block diagram of a transmitter of a secrecy communication system in accordance with the invention.

In the transmitter shown in FIG. 1, the output of a noise generator 10 is fed to a narrow band filter 12 adapted to provide at its output a narrow band random reference signal $e_r$ having a bandwidth which is preferably less than 1,000 cycles. This nonperiodic signal $e_r$ is preferably random but may have a variety of other unpredictable forms and the term "nonperiodic" will hereinafter be used to refer to such random or other unpredictable forms of $e_r$. The nonperiodic narrow band signal $e_r$ is fed to a bandwidth expander 14 which predictably expands the narrow band $e_r$ into a relatively wide band random nonperiodic signal $e_r'$ for use as a transmission carrier. Ordinarily the bandwidth of $e_r'$ will be at least 100 times the bandwidth of $e_r$. A crystal oscillator 16, which produces a highly stable sinusoidal signal at a frequency $f_c$, is applied to the bandwidth expander 14 for purposes which will hereinafter be explained.

width expander 14 is now fed to a mixer 20 where it is mixed with a frequency modulated sinusoidal signal at a frequency $f_0$, the frequency modulation being in accordance with an intelligence signal $e_m$. This frequency modulated sinusoidal signal is obtained by frequency modulating the signal from a local oscillator 24 with the intelligence signal $e_m$ in an FM modulator 22 whose output is then fed to one of the inputs of the mixer 20 as shown. The output of the mixer 20 is then fed to a band-pass amplifier 26 having a center frequency at $f_o+f'_r$ ($f'_r$ corresponding to the center frequency of the wide band random signal $e_r'$ ) and a bandwidth sufficient to pass only the upper sideband obtained at the output of the mixer 20. Thus, at the output of the band-pass amplifier 26 there will be obtained a wide band nonperiodic signal corresponding to the wide band nonperiodic signal $e_r'$ obtained from the bandwidth expander 14, except that it is translated to a frequency equal to the sum of $f_o+f'_r$, and is band modulated in accordance with the intelligence signal $e_m$ (that is, its center frequency varies in accordance with the intelligence signal $e_m$).

The output from the band-pass amplifier 26 is fed to a mixer 28 and also to an amplitude modulator 30. In the mixer 28 the output from the band-pass amplifier 26 is mixed with the sinusoidal signal from the crystal oscillator 16, and the output from the mixer 28 is fed to a band-pass amplifier 32 having a center frequency at $f_o+f'_r+f_c$ and a bandwidth sufficient to pass only the upper sideband. Thus, at the output of the band-pass amplifier 32 there is obtained a wide band nonperiodic signal centered at the frequency $f_o+f'_r+f_c$ and band modulated in accordance with the intelligence signal $e_m$.

In the amplitude modulator 30 the wide band nonperiodic signal from the band-pass amplifier 26 is amplitude modulated in accordance with the narrow band reference signal $e_r$ obtained from the output of the narrow band filter 12, thereby producing at the output of the amplitude modulator 30 a wide band nonperiodic signal centered at the frequency $f_o+f'_r$, band modulated by the intelligence signal $e_m$ and amplitude modulated by the narrow band reference signal $e_r$.

Figure 2:
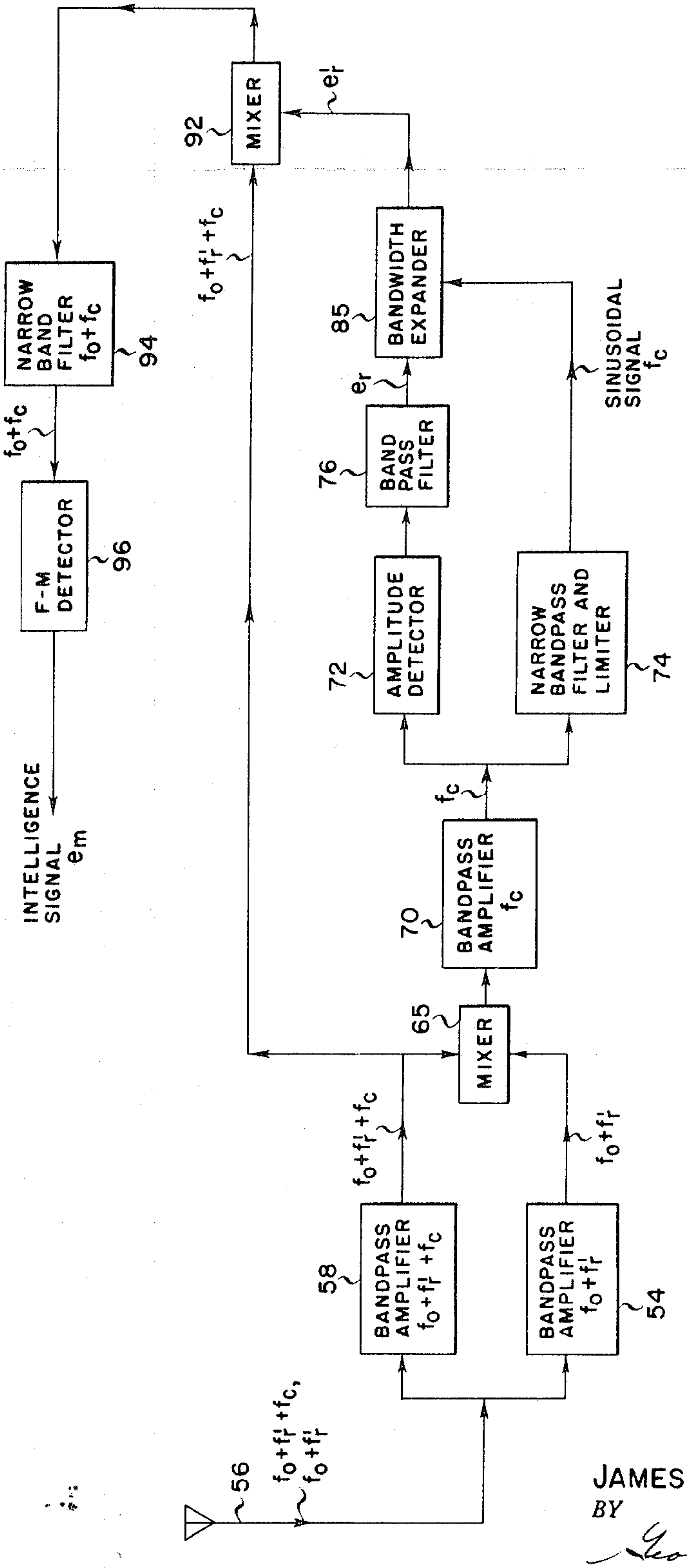
FIG. 2 is a block diagram of a receiver of a secrecy communication system in accordance with the invention.

The outputs from both the band-pass amplifier 32 and the amplitude modulator 30 are now fed to a power amplifier 34 which amplifies both wide band nonperiodic signals to transmission level and then feeds them to an antenna 36 for radiation to the receiver shown in FIG. 2. The frequency $f_c$ by which the center frequencies of the two signals differ is chosen sufficiently large so that the bands of the two signals do not overlap.

In the receiver of FIG. 2 the nonperiodic signal radiated from the transmitter of FIG. 1 is picked up by an antenna 56 and fed to the band-pass amplifiers 54 and 58. The band-pass amplifier 54 has a center frequency at $f_o+f'_r$ and a bandwidth sufficient to pass only the transmitted signal corresponding to the output from the amplitude modulator 30 in FIG. 1. The band-pass amplifier 58, on the other hand, has a center frequency at $f_o+f'_r+f_c$ and a bandwidth sufficient to pass only the transmitted signal corresponding to the output of the band-pass amplifier 32. Obviously, in order to permit these two signals to be separated in this manner, the frequency difference therebetween, which is equal to the frequency $f_c$, must be sufficiently large so that the two bands of nonperiodic energy are not overlapping.

The separated signals from the band-pass amplifiers 54 and 58 are fed to the inputs of a mixer 65 and the resultant mixed output from the mixer 65 is fed to a band-pass amplifier 70 having a center frequency at $f_c$, the difference between the center frequencies of the signals from the band-pass amplifiers 54 and 58. The bandwidth of the band-pass amplifier 70 is chosen to be at least sufficient to pass the modulation components introduced by the narrow band nonperiodic signal $e_r$ which is first introduced into the system at the output from the narrow band filter 12 in the transmitter of FIG. 1.

The output from the band-pass amplifier 70 is fed to a narrow band-pass filter and limiter 74 which is sufficiently narrow so that a sinusoidal signal at the frequency $f_c$ is obtained at the output thereof corresponding identically to the sinusoidal signal originally obtained from the crystal oscillator 16 in the transmitter of FIG. 1. The output of the band-pass amplifier 70 is also fed to an amplitude detector 72 and then to a band-pass filter 76 by means of which the narrow band nonperiodic reference signal $e_r$ is derived. The band-pass filter 76 has a bandwidth which is sufficient to pass only the frequency components of the narrow band nonperiodic reference signal $e_r$. Thus, noise which is usually equally spread over the entire frequency band is limited to that present in the very narrow band of $e_r$ and thereby permits $e_r$ to be recovered at the output of the band-pass filter 76 at a high signal-to-noise ratio.

Both the detected signal $e_r$ from the band-pass filter 76 and the sinusoidal signal of frequency $f_c$ at the output of the narrow band-pass filter and limiter 74 are now fed to a bandwidth expander 85 chosen in conjunction with the bandwidth expander 14 of FIG. 1 so that at the output of the bandwidth expander 85 there is produced a wide band nonperiodic signal $e'_r$ which identically corresponds to the signal $e'_r$ produced at the output of the bandwidth expander 14 in FIG. 1. Since this wide band nonperiodic signal $e'_r$ produced at the output of the bandwidth expander 85 is derived from the recovered low-noise narrow band signal $e_r$, its signal-to-noise ratio will be very much higher than could be obtained or derived as a result of transmission of the wide band signal $e'_r$ itself as in some prior art systems.

The output from the band-pass amplifier 58 and the output from the bandwidth expander 85 are now fed to a mixer 92 and the output of the mixer 92 is fed to a narrow band filter 94 centered at the frequency $f_o+f_c$ and having a bandwidth sufficient to pass only the frequency modulation components of the intelligence signal $e_m$. At the output of the narrow band filter 94, therefore, there will be obtained a sinusoidal signal centered at the frequency $f_o+f_c$ which is frequency modulated by the intelligence $e_m$. The intelligence signal can now be derived by feeding the output from the narrow band filter 94 to a conventional FM detector 96 as shown. Because the low-noise wide band signal $e_r$ obtained from the output expander 85 is used as the comparison signal in the mixer 92, the intelligence signal $e_m$ can be obtained at a very much higher signal-to-noise ratio than if a suitable mixing signal were obtained by transmitting a wide band signal corresponding to $e'_r$. The mixer 92 is preferably of the form described in "Modulation Theory" by H. S. Block, 145–148.

It will now be realized by those skilled in the art that a system such as described above in connection with FIGS. 1 and 2 permits the recovery of the intelligence signal at signal-to-noise ratio that is at least as great as the original narrow band signal $e_r$ and this can be quite significant because of the narrow band of $e_r$ which may be provided in the transmitter by proper choice of the narrow band filter 12.

There are various possible techniques for predictably expanding the bandwidth of a narrow band nonperiodic signal as is required of the bandwidth expanders 14 and 85 in FIGS. 1 and 2. I prefer to use for these bandwidth expanders 14 and 85 the specific forms thereof illustrated in FIGS. 3 and 4, the diagram of FIG. 3 corresponding to the bandwidth expander 14 of FIG. 1 and the diagram of FIG. 4 corresponding to the bandwidth expander 85 of FIG. 2, both of which are adjusted so that they expand the reference narrow band nonperiodic signal $e_r$ to produce substantially the same wide band nonperiodic signal $e'_r$.

Figure 3:
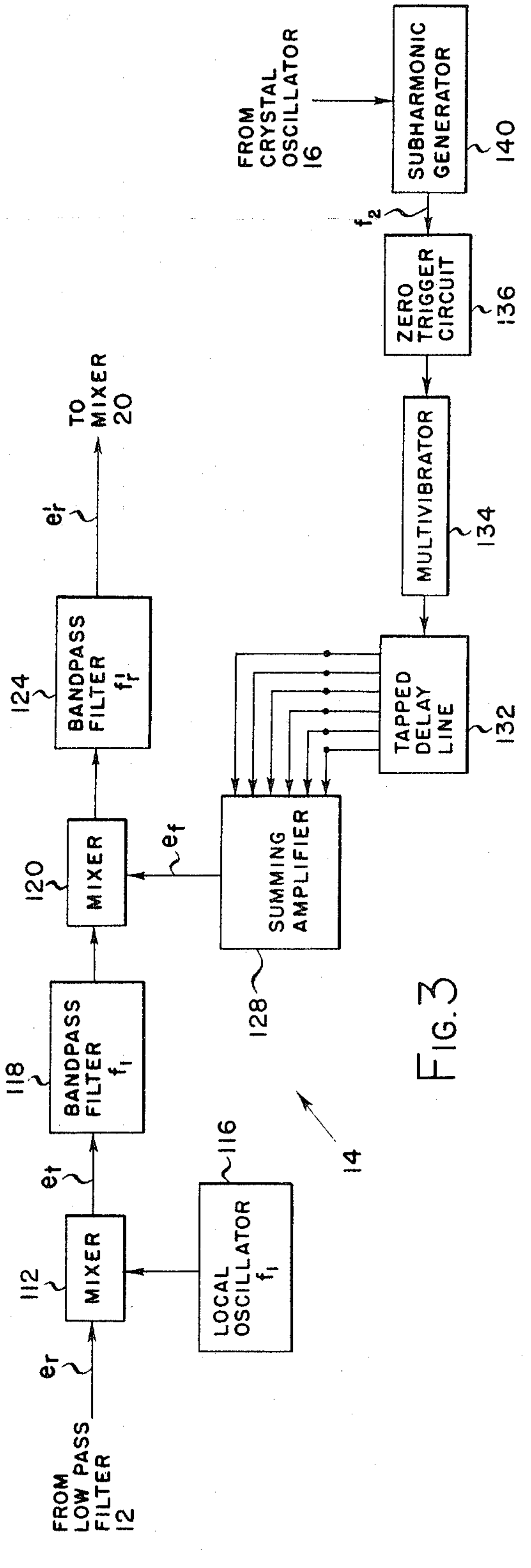
FIG. 3 is a block diagram of the bandwidth expander 14 of FIG. 1.

In the bandwidth expander 14 shown in FIG. 3 the narrow band nonperiodic reference signal $e_r$ from the narrow band filter 12 is fed to a mixer 112 where it is mixed with the sinusoidal signal obtained from a local oscillator 116 having a frequency $f_1$. At the output of the mixer 112, therefore, there appears the narrow band nonperiodic reference signal $e_r$ translated to the frequency $f_1$, which is then fed to a band-pass filter 118 having a center frequency at $f_1$ and a bandwidth sufficient to pass the narrow band of $e_r$. The output of the band-pass filter 118 is fed to another mixer 120 where it is mixed with a predictable wide band pseudorandom signal $e_f$ from a summing amplifier 128 and is then fed to a band-pass filter 124 having a bandwidth chosen to provide the desired bandwidth for the wide band nonperiodic signal $e'_r$ obtained at the output therefrom.

The pseudorandom signal from the summing amplifier 128 which is fed to the mixer 120 is derived as follows. The crystal oscillator 16 feeds a subharmonic generator 140 in order to provide a stable sinusoidal signal at a very low frequency $f_2$ which is less than the bandwidth of the narrow band nonperiodic reference signal $e_r$ obtained from the narrow band filter 12. The stabilized low-frequency sinusoidal output of the subharmonic generator 140 is fed to a zero trigger circuit 136 adapted to produce trigger pulses accurately corresponding to each time the sinusoidal output from the subharmonic generator 140 goes through zero. These trigger pulses generated by the zero trigger circuit 136 are then fed to a multivibrator 134, thereby producing at its output highly stable pulses occurring at the repetition frequency $f_2$.

The stable pulses appearing at the output of the multivibrator 134 are fed to a tapped delay line 132 which may be a conventional type of delay line having taps at predetermined points therealong. Also, the delay line 132 is chosen as far as frequency response is concerned so that harmonics of the multivibrator repetition frequency $f_2$ are obtained up to some maximum frequency at the taps of the delay line 132. The rise time of the pulses obtained from the multivibrator 134 must of course be sufficiently short to permit the necessary range of harmonics to be obtained, but this is usually no problem at all with conventional multivibrators whose rise time is entirely adequate for most situations. The signals from the taps along the delay line 132 are then added together in a summing amplifier 128 to provide at its output a signal $e_f$ which can be considered as pseudorandom in that it will consist of a plurality of discrete harmonics of $f_2$, that is, $f_2$, $2f_2$, $3f_2$ up to $f_n$, the value of n being chosen in accordance with the bandwidth required of $e'_r$.

In the mixer 120 the nonperiodic narrow band signal $e_r$ which has been translated to the frequency of the local oscillator $f_1$ mixed with the pseudorandom signal $e_f$ from the summing amplifier 128, to produce at the output of the mixer 120 a wide band nonperiodic signal in which the discrete harmonics obtained at the output of the summing amplifier 128 can no longer be recognized. This is because the nonperiodic reference signal $e_r$, whose bandwidth is greater than the frequency spacing $f_2$ between the harmonics of $f_2$, causes an effective smearing of the harmonics during mixing. The band-pass filter 124 determines the particular band of the output of the mixer 120 which is to make up $e'_r$. The wide band nonperiodic signal $e'_r$ thus obtained completely masks the predictable derivation thereof, making it most difficult for an unwanted listener to make sense out of the transmitted signals without knowing the details of the delay line 132 in addition to knowing the details of the system itself.

Figure 4:
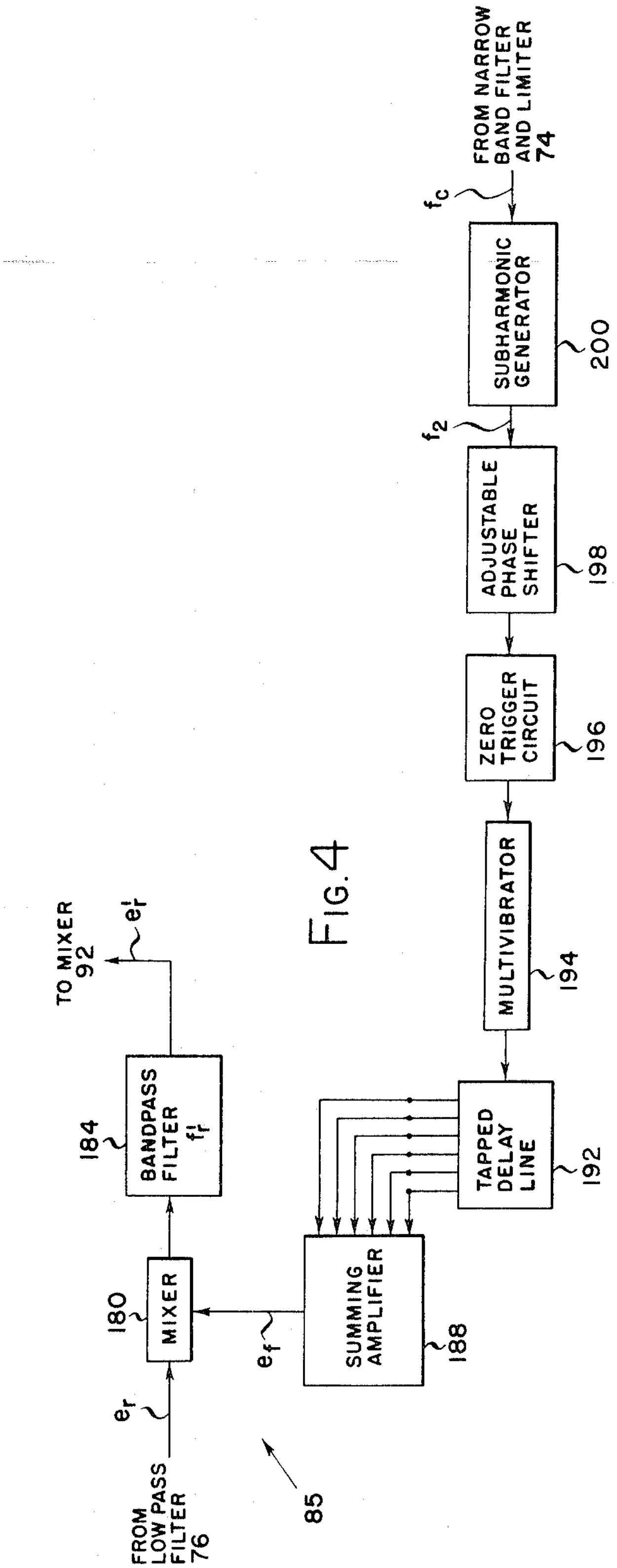
FIG. 4 is a block diagram of the bandwidth expander 85 of FIG. 2.

FIG. 4 shows a block diagram of the bandwidth expander 85 which is used in the receiver of FIG. 2 and incorporates electronic components similar to that employed in the expander of FIG. 3. In the bandwidth expander 85, the recovered low-noise narrow band reference signal $e_r$ from the band-pass filter 76 is fed to the mixer 180 (which corresponds to the mixer 120 in the bandwidth expander 14 of FIG. 3) where it is mixed with a substantially identical pseudorandom signal $e_f$ from a summing amplifier 188, the output of the mixer 180 being fed to a band-pass filter 184 to produce the wide band nonperiodic signal $e'_r$. The summing amplifier 188 and the band-pass filter 184 may be the same as 128 and 124 in FIG. 3.

The pseudorandom signal $e_f$ from the summing amplifier 188 is generated in a similar manner to that of FIG. 3 by feeding the recovered sinusoidal signal at the frequency $f_c$ from the narrow band-pass filter and limiter 74 to a subharmonic generator 200 to produce a very stable low-frequency signal having the same frequency $f_2$ as was obtained from the subharmonic generator 140 in FIG. 3. In the bandwidth expander 85 of FIG. 4, however, it is necessary to employ an adjustable phase shifter 198 after the subharmonic generator 200 in order to insure that the phase of the low-frequency sinusoidal signal of frequency $f_2$ obtained from the subharmonic generator 200 is exactly in phase with the sinusoidal signal generated by the subharmonic generator 140 of FIG. 3. One convenient way of determining the proper adjustment of the adjustable phase shifter 198 is by means of a manual control associated therewith which the operator adjusts until the intelligence is clearly receivable, for example if the intelligence signal were a voice signal. Alternatively, the envelope of the output from the narrow band filter 94 in FIG. 2 could be suitably observed by various means and the adjustable phase shifter 198 adjusted until the envelope is maximum.

Figure 5:
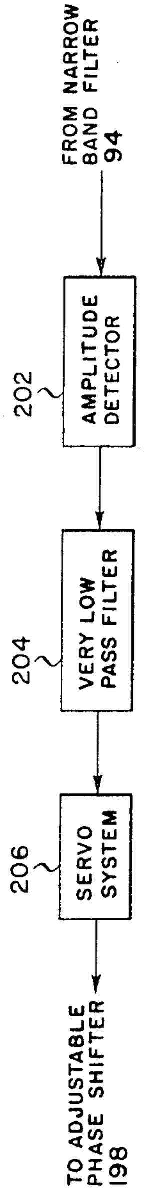
FIG. 5 is a block diagram of an automatic control circuit for use with the receiver of FIG. 2.

If it were desired to incorporate an automatic control to operate the adjustable phase shifter 198, the output from the narrow band filter 94 could be fed to an automatic control system such as shown in FIG. 5 in which the output from the filter 94 is first fed to an amplitude detector 202 which detects the envelope of the output from the filter 94 and then feeds the envelope signal obtained to a very low pass filter 204 which passes only the slowly varying amplitude components caused by a possible out of phase condition between the signal at the output of the adjustable phase shifter 198 in FIG. 4 and the output of the subharmonic generator 140 in FIG. 3. Thus, the output from the very low pass filter 204 is a signal having an amplitude corresponding to the out of phase condition and may be fed to a servosystem 206, which may take any of a variety of well-known forms. The servosystem 206 is adapted to control the phase shift provided by the adjustable phase shifter 198 in a manner so that the output of the filter 204 is maintained at maximum amplitude, thereby effectively insuring that the sinusoidal signals at the outputs of the subharmonic generator 140 in FIG. 3 and the phase shifter 198 in FIG. 4 will be exactly in phase at all times.

The pulses produced by the zero trigger circuit 196 in the bandwidth expander 85 of FIG. 5 will then coincide with those produced by the trigger circuit 136 of the bandwidth expander of FIG. 3 and the output pulses obtained from the multivibrator 194 will coincide with those obtained from the multivibrator 134 of FIG. 3. The tapped delay line 192 is made substantially identical to the tapped delay line 132 so that the identical pseudorandom signal $e_f$ will appear at the output of the summing amplifier 188 to which the taps of the delay line 192 are fed. The band-pass filter 184 performs the same operation as the band-pass filter 124 and provides the desired final bandwidth for the wide band reference signal $e'_r$ which is to be fed to the mixer 92 of the receiver of FIG. 2 to enable the intelligence signal $e_m$ to be recovered as previously described.

At this time it may be noted that the use of wide band transmitted signals in the system described is advantageous in that jamming would be quite difficult if not impossible to accomplish, since it is most unlikely that the proper relationship of jamming energy could be supplied over a large enough band to successfully jam the system, particularly in view of the fact that the system is capable of operating at such low signal-to-noise ratios.

In order to permit the present invention to be fully understood, specific frequency values will now be presented for the system described, but it is to be understood that these specific values are presented for illustrative purposes and are not to be considered as limiting the scope of the invention.

Figure 6:
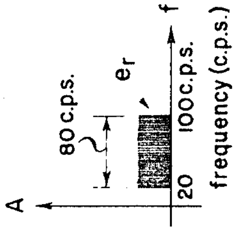
FIGS. 6–9 are graphs of frequency spectra appearing at various points in the block diagrams of a specific embodiment of the invention.

First, the bandwidth of the narrow band filter 12 may be chosen so that the narrow band reference signal obtained at its output is a noise signal having approximately constant energy per unit bandwidth and ranging in frequency from the order of 20 to 100 cycles as shown in the graph of FIG. 6.

Figure 7:
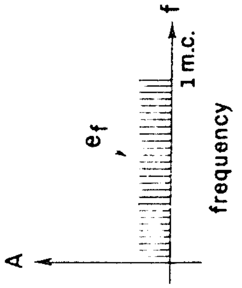

The stabilized output of the crystal oscillator 16 may be chosen at a frequency $f_c$ of 1 megacycle and this 1 megacycle frequency is reduced to a frequency $f_2$ of 100 cycles by the subharmonic generators 140 and 200. The frequency response of the tapped delay lines 132 and 192 is chosen such that discrete harmonics of 100 cycles up to a maximum frequency of approximately 1 megacycle are obtained at the output taps as shown in the graph of FIG. 7. The frequency $f_1$ of the local oscillator 116 is chosen at 2 megacycles so that when the nonperiodic reference signal $e_r$ ranging from 20 to 100 cycles is mixed with the local oscillator frequency of 2 megacycles in the mixer 112, a resultant nonperiodic signal is obtained centered at 2 megacycles having a bandwidth of 80 cycles as shown in FIG. 8.

Figure 8:
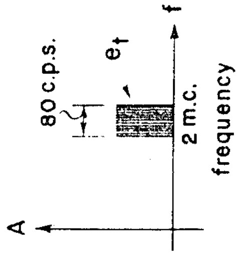
Figure 9:
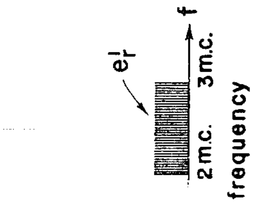

When the nonperiodic signal of FIG. 8 is now mixed with the pseudorandom output signal $e_f$ of the summing amplifier 128 shown in FIG. 7, and then fed to the band-pass filter 124 having a bandwidth ranging from 2 to 3 megacycles to pass only the upper sideband of the mixer output, the resulting wide band nonperiodic signal $e'_r$ obtained at the output of the filter 124 will be as shown in FIG. 9. It will be noted in FIG. 9 that the discrete harmonic components of the signal of FIG. 7 have been smeared as a result of the mixing of these discrete harmonics with the narrow band nonperiodic reference signal of FIG. 8. The signal $e'_r$ of FIG. 9 thus appears as a wide band nonperiodic signal, the predictable derivation thereof being completely masked.

The intelligence signal $e_m$ may be a voice signal ranging from 500 to 5,000 cycles and the frequency $f_o$ of the local oscillator 24 may be chosen as 5 megacycles. Thus, there will be radiated from the transmitter of FIG. 1 a first nonperiodic signal centered at 8.5 megacycles with a bandwidth of approximately 1 megacycle, the 8.5 megacycle center frequency being modulated by the intelligence signal $e_m$. Also radiated from the transmitter will be a second nonperiodic signal centered at 7.5 megacycles, band modulated by the intelligence signal $e_m$ and amplitude modulated by the narrow band signal $e_r$. At the receiver these two nonperiodic signals are separated and the intelligence signal $e_m$ detected as described previously.

It is to be understood in connection with the embodiment of the invention described herein that the electronic circuitry and devices designated in block form in these figures are all of a type which can readily be provided by those skilled in the art. Since the present invention resides principally in the combination of these electronic devices and circuitry and not in the design of any particular one thereof, details of these devices and circuitry have not been given, except for the preferred forms of bandwidth expanders shown in FIGS. 3 and 4. However, based upon the description and operation of the various systems provided herein, those skilled in the art will have no difficulty in practicing the present invention with the stated advantages.

It is also to be understood that various modifications in construction and arrangement may be made in the embodiment described and shown herein, in accordance with the invention. For example, those skilled in the art will appreciate that although the system described herein is primarily concerned with the use of a nonperiodic or random energy carrier derived from a narrow band nonperiodic signal, it may be advantageous for certain applications to use the principles of the system described herein in connection with periodic waveforms for improving the signal-to-noise ratio of such systems. Also, those skilled in the art will realize that the wide band carrier signal produced by bandwidth expansion can be modulated by the intelligence and the original narrow band signal in a variety of ways in addition to those exemplified herein, depending upon the requirements of the particular application for which the system is to be employed. Still further, the techniques described herein may well be advantageous for systems other than secrecy communication and the invention is not to be considered to be limited to the use thereof for this purpose. The above examples are not exhaustive and the invention is to be considered as including all possible modifications and variations coming within the scope of the invention as defined in the appended claims.

I claim as my invention:

1. An intelligence communication system comprising a transmitter and a receiver, said transmitter comprising means for obtaining a narrow band reference signal, bandwidth expansion means for expanding said reference signal into a wide band signal having a bandwidth very much greater than the bandwidth of said reference signal, means for modulating said wide band signal with an intelligence signal and said narrow band reference signal, and means for delivering to said receiver a signal corresponding to said wide band signal modulated by said reference signal and said intelligence signal; said receiver comprising means for deriving said narrow band reference signal from the signal delivered to said receiver from said transmitter, bandwidth expansion means for expanding the derived reference signal into a wide band signal substantially identical to the wide band signal produced by said bandwidth expansion means in said transmitter, and means for comparing the signal delivered to said receiver from said transmitter with the wide band signal from said bandwidth expansion means in said receiver to recover said intelligence signal.

2. An intelligence communication system comprising a transmitter and a receiver; said transmitter comprising means for obtaining a narrow band reference signal, bandwidth expansion means for expanding said reference signal into a wide band signal having a bandwidth at least 100 times greater than the bandwidth of said reference signal, means for modulating said wide band signal with an intelligence signal and said reference signal, and means for delivering to said receiver a signal corresponding to said wide band signal modulated by said reference signal and said intelligence signal; said receiver comprising means for deriving said reference signal from the signal delivered to said receiver from said transmitter, bandwidth expansion means for expanding the derived reference signal into a wide band signal substantially identical to the wide band signal produced by said bandwidth expansion means in said transmitter, and means for comparing the signal delivered to said receiver from said transmitter with the wide band signal from said bandwidth expansion means in said receiver to recover said intelligence signal.

3. An intelligence communication system comprising a transmitter and a receiver; said transmitter comprising means for obtaining a narrow band nonperiodic reference signal, bandwidth expansion means for expanding said reference signal into a wide band nonperiodic signal having a bandwidth at least 100 times greater than the bandwidth of said nonperiodic reference signal, means for modulating said wide band nonperiodic signal with an intelligence signal and said nonperiodic reference signal, and means for delivering to said receiver a signal corresponding to said wide band nonperiodic signal modulated by said reference signal and said intelligence signal; said receiver comprising means for deriving said nonperiodic reference signal from the signal delivered to said receiver from said transmitter, bandwidth expansion means for expanding the derived nonperiodic reference signal into a wide band nonperiodic signal substantially identical to the wide band nonperiodic signal produced by said bandwidth expansion means in said transmitter, and means for comparing the signal delivered to said receiver from said transmitter with the wide band nonperiodic signal from said bandwidth expansion means in said receiver to recover said intelligence signal.

4. An intelligence communication system comprising a transmitter and a receiver; said transmitter comprising means for obtaining a narrow band nonperiodic reference signal, bandwidth expansion means for expanding said reference signal into a wide band nonperiodic signal having a bandwidth at least 100 times greater than the bandwidth of said nonperiodic reference signal, means for modulating said wide band nonperiodic signal to produce a first wide band nonperiodic signal band modulated in accordance with an intelligence signal and a second wide band nonperiodic signal band modulated in accordance with said intelligence signal and amplitude modulated in accordance with said nonperiodic reference signal, means for translating one of said first and second signals to a nonoverlapping frequency band, and means for delivering said first and second signals to said receiver; said receiver comprising frequency-sensitive means for separating said first and second nonperiodic wide band signals, means for deriving said narrow band nonperiodic reference signal from said second signal, bandwidth expansion means for expanding the derived narrow band nonperiodic reference signal into a wide band nonperiodic signal substantially identical to the wide band signal produced by said bandwidth expansion means in said transmitter, a mixer to which said first signal and the wide band nonperiodic signal from said bandwidth expander in said receiver are fed, and FM detection means to which the output of said mixer is fed for recovering said intelligence signal.

5. The invention in accordance with claim 4 wherein said bandwidth expansion means in said transmitter comprises means for generating stable pulses at a predetermined frequency which is less than the bandwidth of said narrow band nonperiodic reference signal, a tapped delay line to which these stable pulses are applied, said delay line having taps at predetermined locations therealong, a summing means to which the taps of said delay line are fed for producing a pseudorandom signal which is the sum of the outputs of said taps, and a mixer to which said psuedorandom signal and a signal corresponding to said narrow band nonperiodic reference signal are fed to produce a wide band nonperiodic signal; and wherein said bandwidth expansion means in said receiver comprises means for generating stable pulses at said predetermined frequency in phase with said stable pulses generated in said transmitter, a tapped delay line to which said stable pulses generated in said receiver are applied, said delay line in said receiver having taps at predetermined locations therealong and being substantially identical to said tapped delay line of said bandwidth expansion means in said transmitter, a summing means to which the taps of said delay line in said receiver are fed to produce substantially the same pseudorandom signal as produced at the output of said summing means in said transmitter, and a mixer to which said pseudorandom signal in said receiver and a signal corresponding to the derived narrow band nonperiodic signal in said receiver are fed to produce the same wide band nonperiodic signal as produced at the output of said mixer in said transmitter.

6. The invention in accordance with claim 5: wherein said means for translating includes a mixer to which one of said first and second signals is fed, and a stable oscillator producing a signal of predetermined frequency which is also fed to said last-mentioned mixer, the difference in frequency between said first and second signals delivered to said receiver thereby being the predetermined frequency of said oscillator; wherein said receiver includes means for deriving from said first and second signals by mixing a signal having the predetermined frequency of said oscillator; and wherein said bandwidth expansion means in said transmitter and receiver each include a subharmonic generator for producing a signal at a predetermined subharmonic frequency which controls the frequency of the pulses produced by said means for generating in each of said bandwidth expansion means, the frequency of the stable pulses produced by said means for generating in both bandwidth expansion means thereby being maintained equal, said bandwidth expansion means in said receiver also including phase shift means for bringing the pulses generated by said means for generating in said receiver in phase with the pulses generated by said means for generating in said transmitter.

7. A random energy ratio transmitter comprising means for obtaining a narrow band reference signal, bandwidth expansion means for expanding said reference signal into a wide band signal having a bandwidth very much greater than the bandwidth of said reference signal, means for modulating said wide band signal with an intelligence signal and said narrow band reference signal, and means for radiating a signal corresponding to said wide band signal modulated by said reference signal and said intelligence signal.

8. A random energy ratio transmitter comprising means for obtaining a narrow band reference signal, bandwidth expansion means for expanding said reference signal into a wide band signal having a bandwidth at least 100 times greater than the bandwidth of said reference signal, means for modulating said wide band signal with an intelligence signal and said reference signal, and means for radiating a signal corresponding to said wide band signal modulated by said reference signal and said intelligence signal.

9. Apparatus for receiving and detecting a radio signal wherein the intelligence together with a narrow band reference signal is modulated onto a carrier derived by expanding the narrow band reference signal by a very great amount comprising means for deriving said narrow band reference signal from the radio signal, bandwidth expansion means for expanding the derived reference signal into a wide band signal substantially identical to the wide band signal in the radio signal, and means for comparing the radio signal with the wide band signal from said bandwidth expansion means.

* * * * *